United States Patent [19]
Fallon et al.

[11] Patent Number: 5,765,944
[45] Date of Patent: Jun. 16, 1998

[54] SUN SHIELDS FOR HOUSING ASSEMBLIES CONTAINING ILLUMINATED GLASS TUBING

[76] Inventors: Timothy Ross Fallon, 15 Avian Trail, Columbia, S.C. 29206; Walter Keisler Tanner, 604 Montgomery Dr., Chesnee, S.C. 29323

[21] Appl. No.: 794,842

[22] Filed: Feb. 4, 1997

Related U.S. Application Data

[63] Continuation of Ser. No. 598,573, Feb. 12, 1996, abandoned, which is a continuation-in-part of Ser. No. 389,314, Feb. 16, 1995, Pat. No. 5,541,823.

[51] Int. Cl.⁶ ................... F21V 11/00; F21V 11/16; F21V 17/00; F21V 17/06
[52] U.S. Cl. ................ 362/359; 362/351; 362/217; 362/223; 362/457
[58] Field of Search ..................... 362/217, 223, 362/359, 260, 225, 257, 317, 351, 353, 360, 361, 376, 433, 457, 64, 311

[56] References Cited

U.S. PATENT DOCUMENTS

| | | | |
|---|---|---|---|
| 2,082,523 | 6/1937 | Segal | 40/545 |
| 2,631,394 | 3/1953 | Sopocko | 40/564 |
| 3,140,055 | 7/1964 | Long | 362/223 |
| 3,780,285 | 12/1973 | Appeldorn et al. | 362/311 |
| 4,201,004 | 5/1980 | Witt | 40/545 |
| 5,072,350 | 12/1991 | Lowell et al. | 362/322 |
| 5,124,896 | 6/1992 | Bentley | 362/223 |
| 5,150,961 | 9/1992 | Gonzalez | 362/83.2 |
| 5,192,125 | 3/1993 | Gonzalez | 362/83.2 |
| 5,211,473 | 5/1993 | Gordin et al. | 362/297 |
| 5,255,166 | 10/1993 | Gonzalez | 362/83.2 |
| 5,313,379 | 5/1994 | Lemons et al. | 362/298 |
| 5,339,226 | 8/1994 | Ishikawa | 362/61 |
| 5,522,634 | 6/1996 | Stanesic et al. | 296/95.1 |
| 5,577,830 | 11/1996 | Barry et al. | 362/152 |
| 5,651,606 | 7/1997 | Krogman | 362/96 |
| 5,651,611 | 7/1997 | Weiler | 362/303 |

OTHER PUBLICATIONS

Brochure, United States Neon Corporation, "The Future of Light" (date not known).

*Primary Examiner*—Ira S. Lazarus
*Assistant Examiner*—Ljiljana V. Ciric
*Attorney, Agent, or Firm*—Hardaway Law Firm, P.A.

[57] ABSTRACT

A lighting unit that reduces the effect of back lighting having a housing assembly containing an elongated bulb having a longitudinal axis which is horizontally aligned; a transparent and central section, the transparent portion containing the mounted bulb and having spaced apart tabs mounted on an inside surface thereof; and a sun shield attached to the housing assembly. The sun shield, which is positioned between a source of bright light independent of the housing assembly and the housing assembly, having a shield portion and a mounting portion, the mounting portion comprising a bracket portion perpendicular to the shield having a fastener receiving hole through which a fastener is passed to attach the sun shield to the housing assembly. The sun shield also provides protruding members on an outside surface, and at least one catch member on the inside surface, whereby the sun shield may also be attached to the housing assembly by placing the catch member of the sun shield over the protruding member of the housing assembly. The sun shield further comprises a piece of opaque film placed between the tabs which are mounted on the inside surface of the transparent portion of the housing assembly, the film being flush with the inside surface of the transparent portion of the housing assembly within which the bulb is mounted.

13 Claims, 10 Drawing Sheets

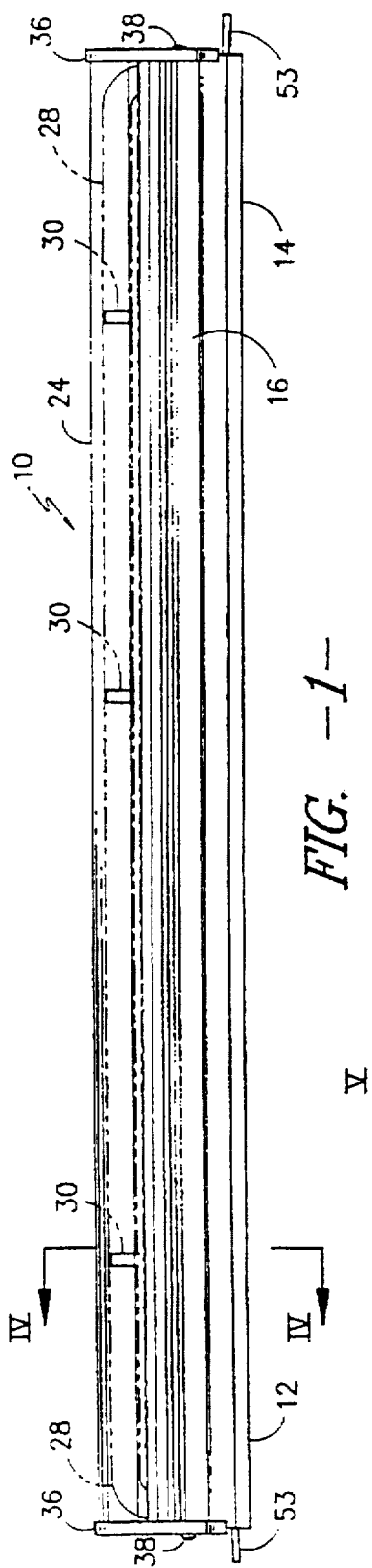
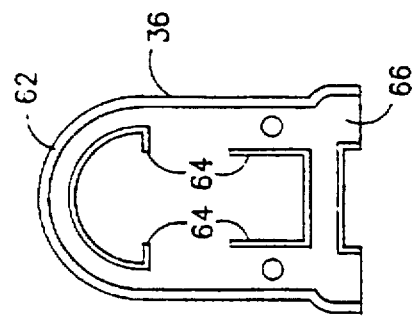
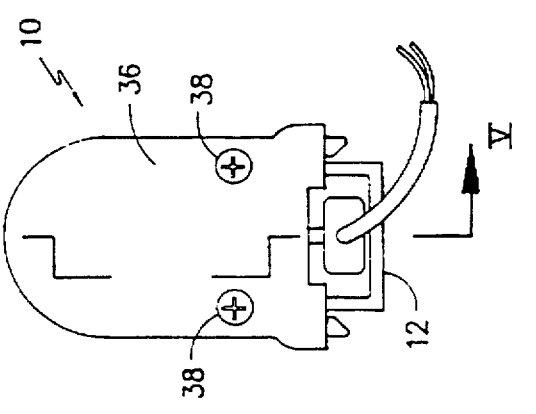

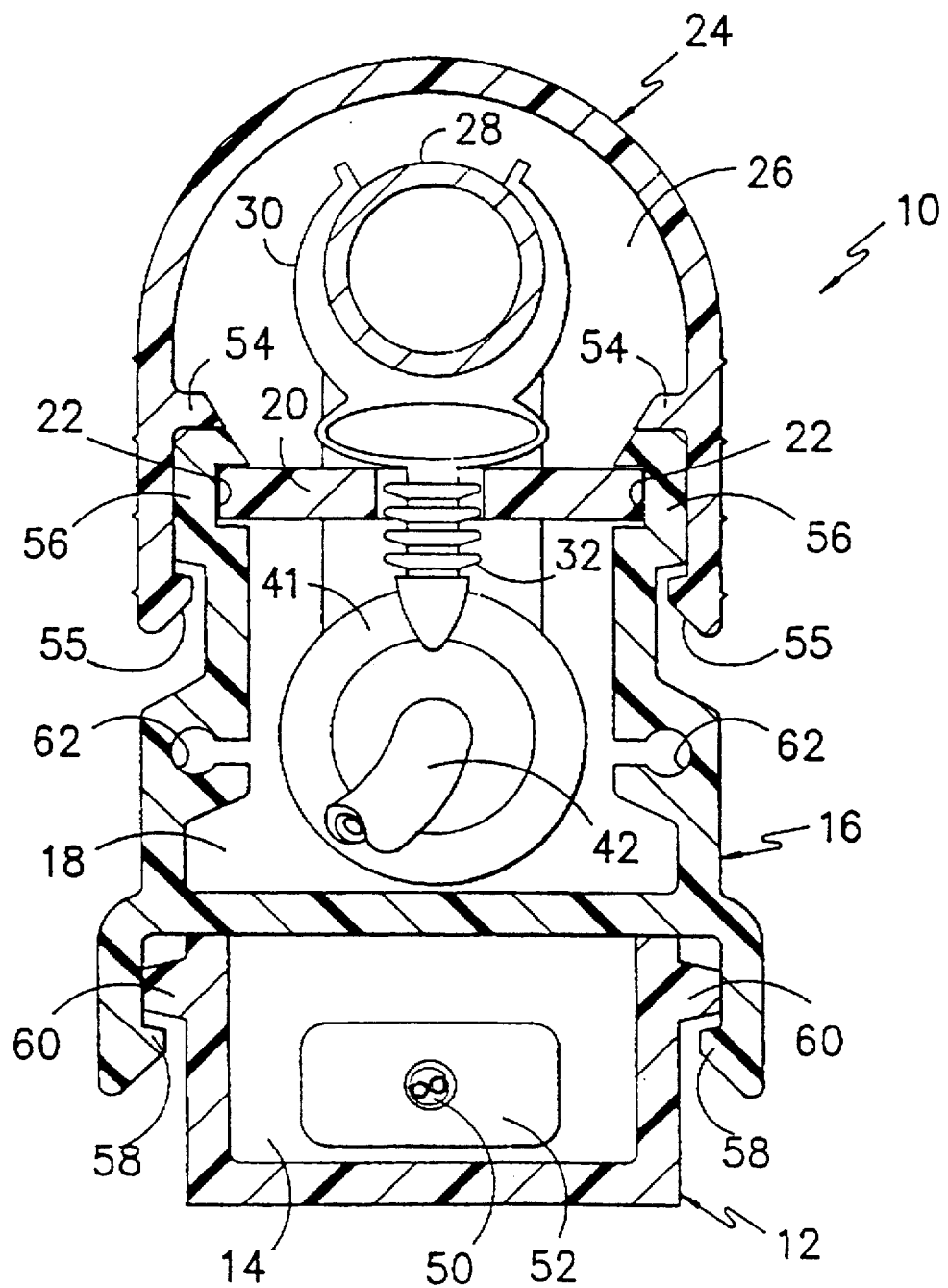
FIG. —4—

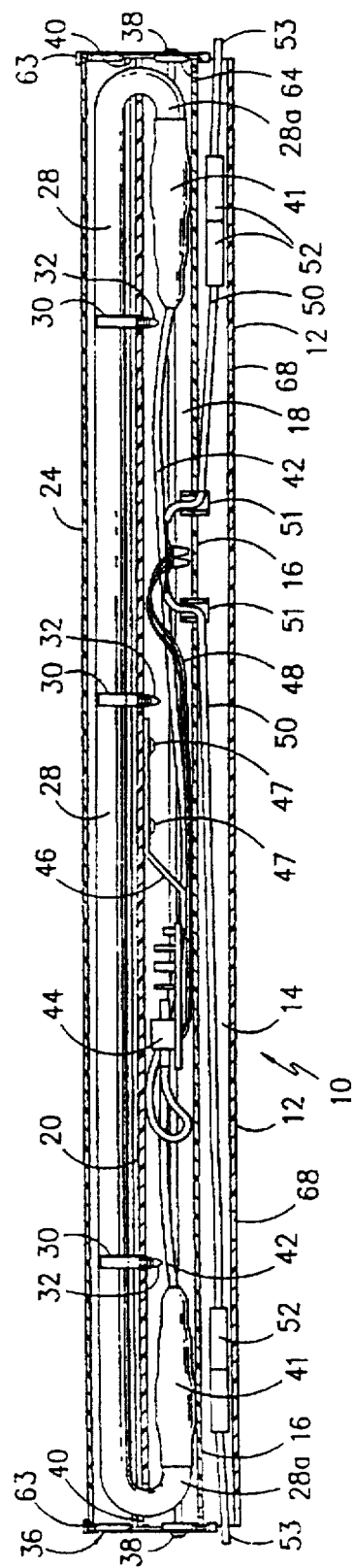
FIG. -5-
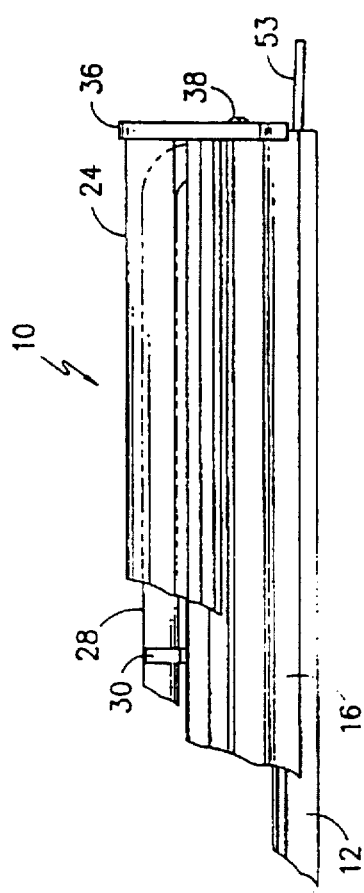
FIG. -6-

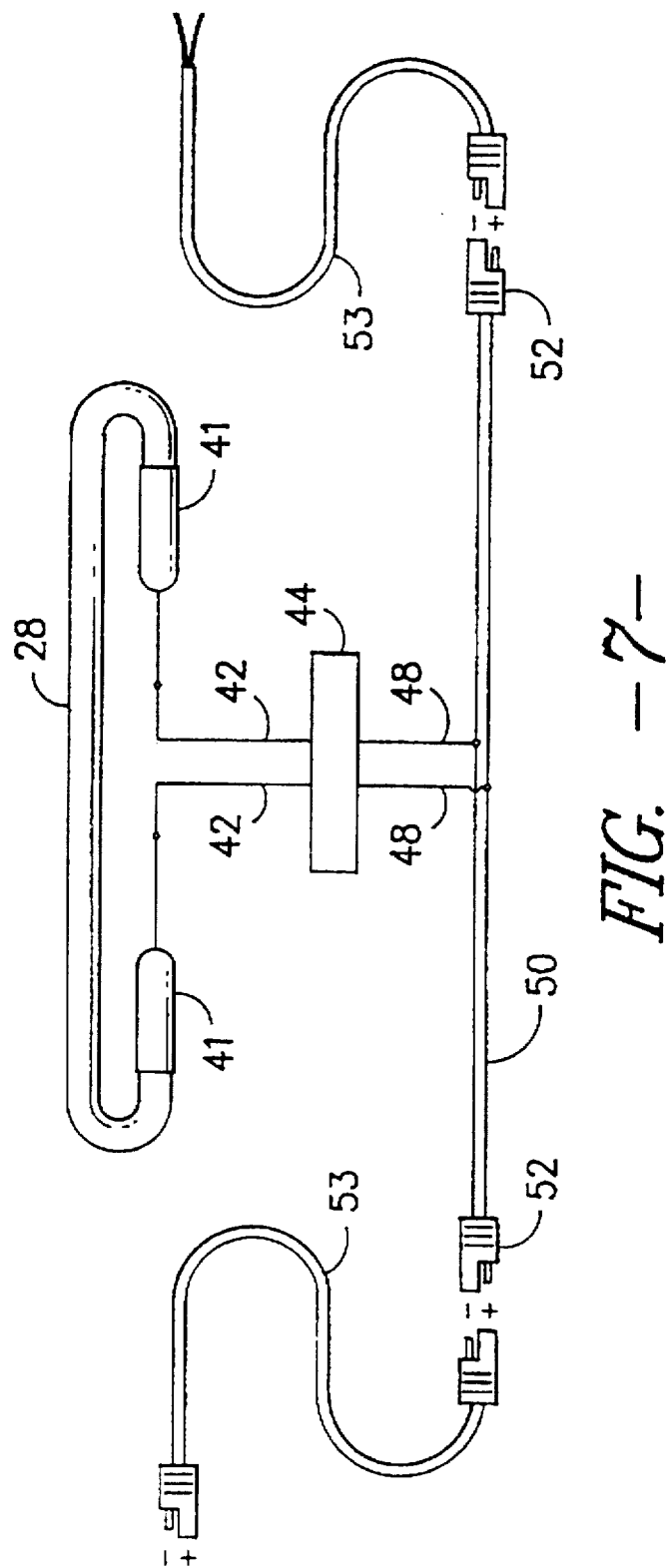
FIG. -7-

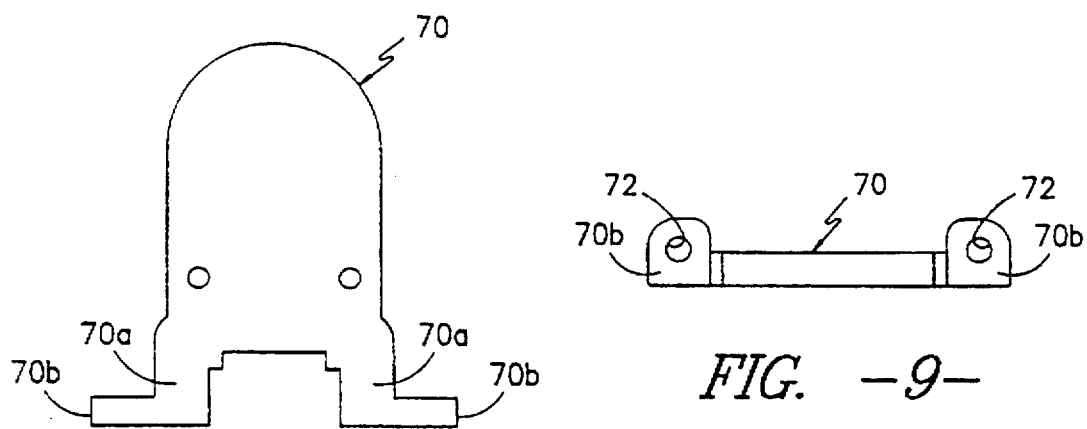
FIG. -8-
FIG. -9-

5,765,944

1

SUN SHIELDS FOR HOUSING ASSEMBLIES CONTAINING ILLUMINATED GLASS TUBING

RELATED APPLICATIONS

This application is a continuation of application Ser. no. 08/598,573 filing date Feb. 12, 1996, now abandoned, which is a continuation-in-part of allowed U.S. Ser. No. 389,314, filed Feb. 16, 1995, now U.S. Pat No. 5,541,823.

BACKGROUND OF THE INVENTION

FIG. 17 shows an anticipated use of the housing assembly 10 described and claimed in this application's parent patent application referred to above. In that use, housing assembly 10 is mounted to a support surface S, such as the outer walls of a building. With this use, we found that because the light produced by the sun is so much brighter than that produced by neon bulb 24 of housing assembly 10, a person P standing on the ground G will be unable to make out the light emitted from bulb 24. Considering that housing assembly 24 was developed for accent lighting purposes, this is unacceptable.

Accordingly, there is room for improvement within the art.

OBJECTS OF THE PRESENT INVENTION

It is an object of the invention to provide a housing assembly in which a sun shield is used to eliminate the effects of bright back-lighting.

It is a further object of the invention to provided a housing assembly in which the sun shield can be easily attached to housing unit of the light.

It is yet a further object of the invention to provide a housing assembly in which the sun shield can be provided at the factory and inside the housing assembly of the housing assembly.

These and other objects of the invention are achieved by a lighting unit that reduces the effects of back lighting comprising: a housing assembly containing an elongated bulb having a longitudinal axis, the longitudinal axis being horizontally aligned; and a sun shield attached to the housing assembly, the sun shield positioned between a bright light independent of the housing assembly and the housing assembly.

BRIEF DESCRIPTION OF THE DRAWINGS

FIG. 1 is a side elevation view of a housing assembly for protective support of illuminated glass tubing according to the present invention;

FIG. 2 is an enlarged right end view of the housing assembly of FIG. 1 showing the outside surface of an end cap of the assembly;

FIG. 3 is an elevation view of the inside surface of an end cap of the housing assembly;

FIG. 4 is an enlarged cross-sectional view of the housing assembly of FIG. 1, with left-hand end cap removed, taken generally along line IV—IV of FIG. 1, an d looking in the direction of the arrows;

FIG. 5 is a sectional elevation view of the housing assembly taken generally along the indicated lines V—V of FIG. 2, and looking in the direction of the arrows thereof;

FIG. 6 is an e nlarged, broken-away side elevation view of the right-side end portion of the housing of FIG. 1;

FIG. 7 is a wiring diagram of the illuminated glass tubing of the housing assembly, showing schematically the electri-

Figure 10:
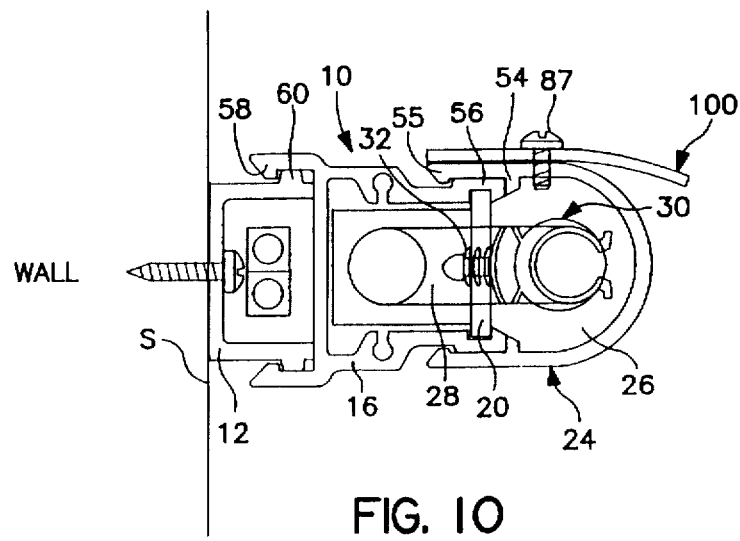
Figure 11:
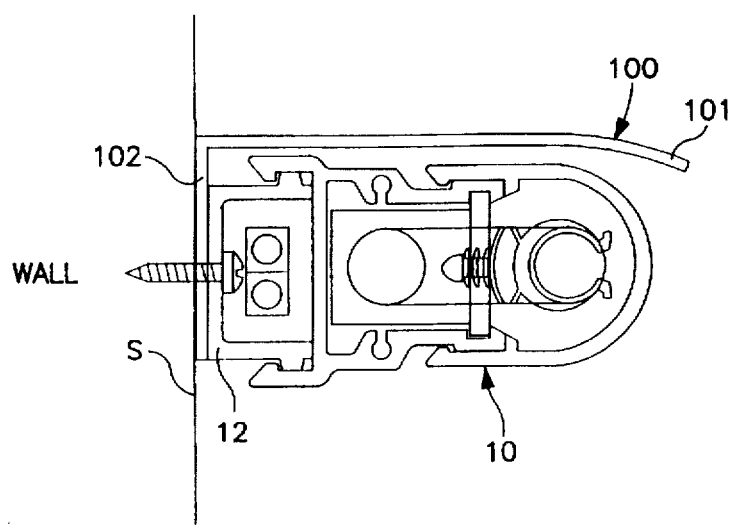
Figure 12:
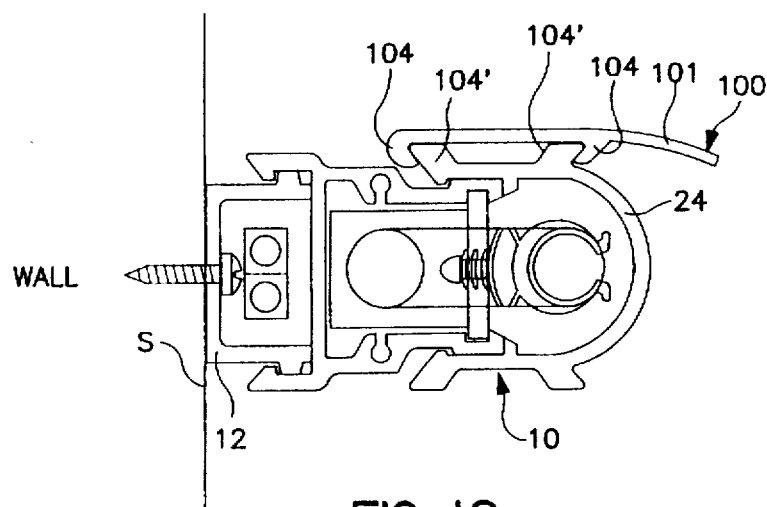
Figure 13:
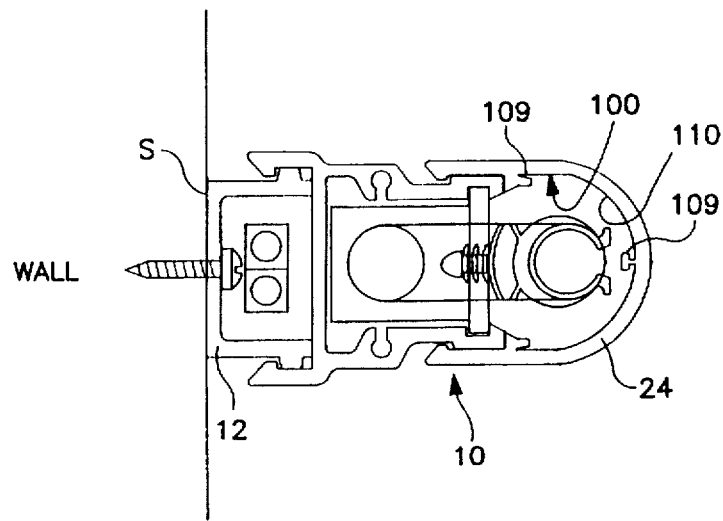
Figure 14:
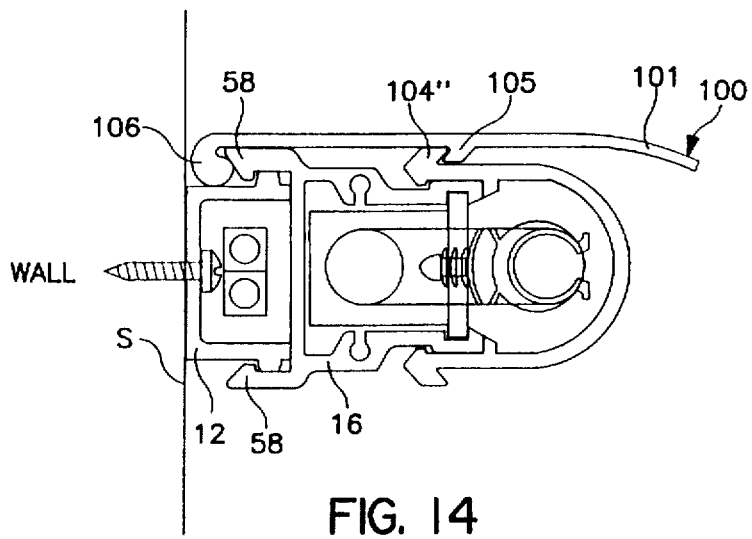
Figure 15:
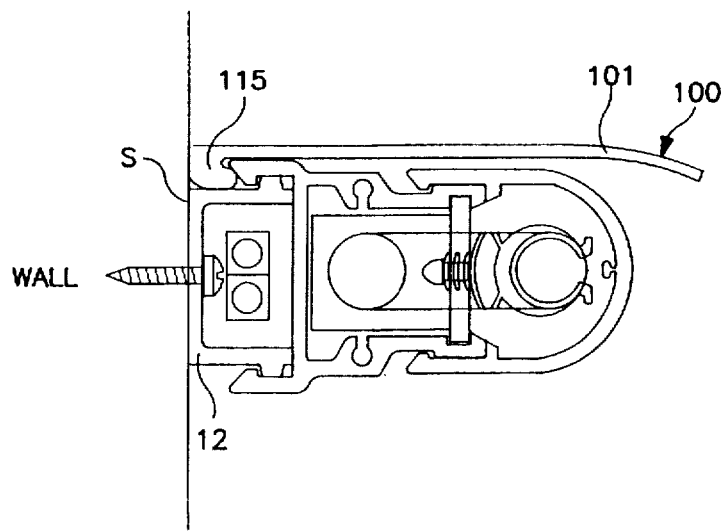
Figure 16:
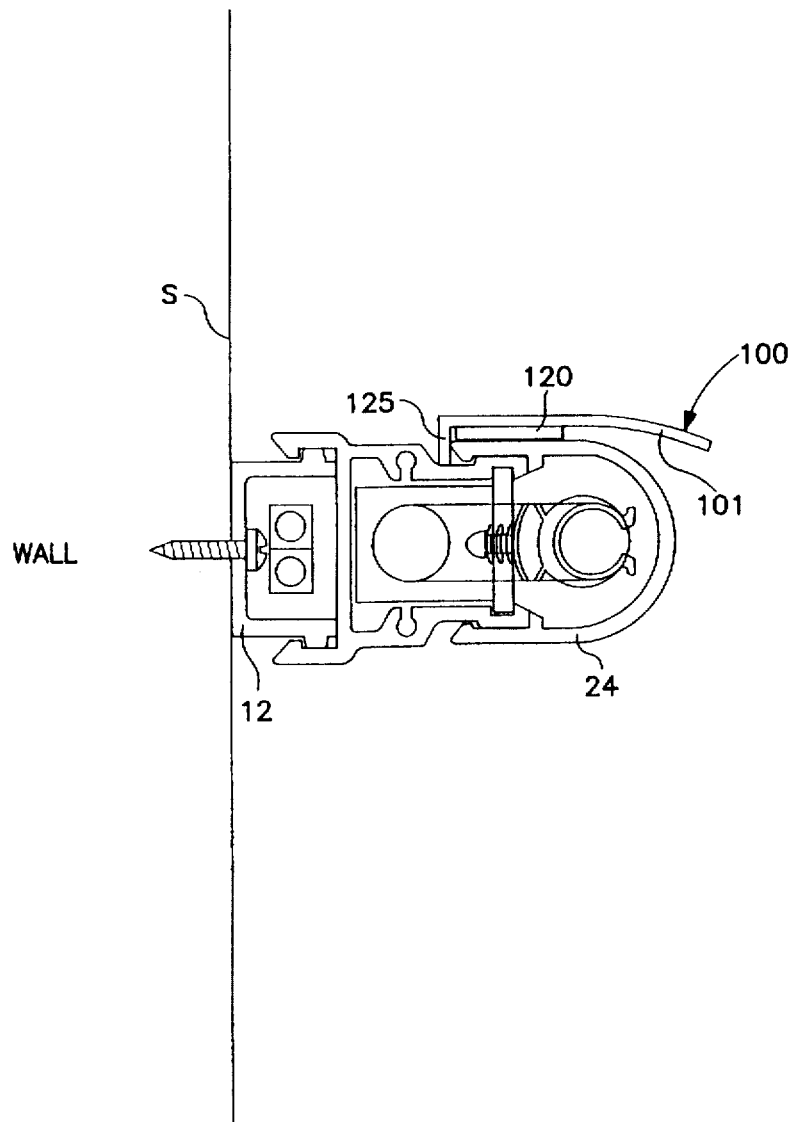

2 cal connections and components supplying low voltage power to the illuminated tubing of housing assembly;

FIG. 8 is an enlarged elevation view of the outside face of a modified form of end cap for the housing assembly of FIG. 1;

FIG. 9 is a top plan view of the modified end cap seen in FIG. 8;

FIG. 10 is an end view of a housing for a housing assembly having a first embodiment of a sun shield;

FIG. 11 is an end view of a housing for a light assembly having a second embodiment of a sun shield;

FIG. 12 is an end view of a housing for a light assembly having a third embodiment of a sun shield;

FIG. 13 is an end view of a housing for a light assembly having a fourth embodiment of a sun shield;

FIG. 14 is an end view of a housing for a light assembly having a fifth embodiment of a sun shield;

FIG. 15 is an end view of a housing for a light assembly having a sixth embodiment of a sun shield;

FIG. 16 is an end view of a housing for a light assembly having a seventh embodiment of a sun shield; and .

Figure 17:
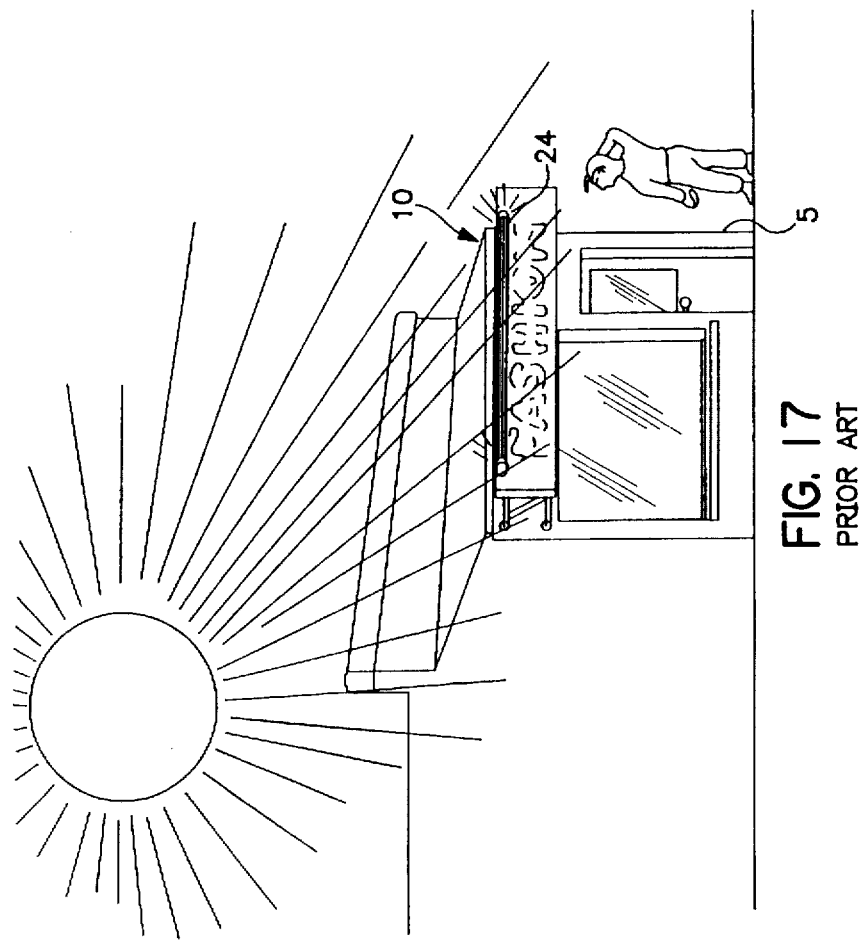

FIG. 17 is an elevational view showing how bright backlighting by the sun can degrade the lighting effects produced by the bulb contained within the housing assembly.

DETAILED DESCRIPTION OF PREFERRED EMBODIMENTS

Referring more particularly to the drawings, the housing assembly 10 for protective support of illuminated glass tubing of the present invention includes a mounting base section 12 having wall portions forming an open-sided elongated channel 14, a central section 16 having wall portions forming an open-sided elongated channel 18, an elongated flat support plate 20 slidably received and supported in opposed elongated grooves 22 located adjacent the open side of central section channel 18, and a cover section 24 having a wall of generally semi-circular shape forming an open-sided elongated channel 26. (Note particularly FIG. 4.)

The components of the housing assembly 10 preferably are formed of a suitable resiliently deformable material, such as plastic, which are molded into the configurations shown. For economical and simple fabrication, the mounting base section 12, central section 16, and cover section 24 each are of constant cross-sectional shape along their lengths, enabling the formation of the sections in a conventional extrusion molding operation. (See FIG. 4). The plastic material employed for the housing conveniently may be LEXAN®. The housing assembly sections may be extruded in varying lengths, as desired, and end caps 36 of rigid plastic are secured to the ends of the housing by screws 38 to close the channels of the central and cover sections, and to protect components therein from elements of weather or other contamination.

The mounting base section 12, central section 16, support plate 20, and end caps 36 are generally opaque, while the cover section 24 is formed transparent or translucent for transmission of light from the illuminated glass tubing 28 from the housing assembly.

Located inside the cover section 24 is elongated glass tubing 28 of the neon-tube type. The tubing 28 is supported in the housing by means of a plurality of tube-engaging clips 30 of resiliently deformable material which are attached to support plate 20 by means of a deformable threaded projection 32 which is fictionally received in and extends through openings 34 in the support plate.

As best seen in FIGS. 4 and 5, the length of glass tubing 28 is supported in snap-fit relation in each of the clips 30 and end portions 28a of the tubing are bent, as in a glass heating operation, to extend downwardly from the cover section channel through openings 40 in support plate 20 into the channel 18 of the central section 16 (FIGS. 4 and 5). The ends of the glass tubing are electrically connected, as by electrodes 41, through transformer output wiring 42 to transformer means 44 which is attached by means of a mounting bracket 46 with fastening screws 47 to the underside of support plate 20 (FIG. 5). The transformer means 44 is in turn connected by means of wiring 48 to a length of jumper wiring 50 located in the mounting base section channel of the housing. One end of the jumper wiring sections 50 extends through small openings in the lower wall of the central section for connection to the wiring 48 and the ends are frictionally secured therein by wire strain relief elements 51. The other ends of the jumper wiring are provided with electrical connection sockets 52 to be attached by additional short lengths of jumper wiring 53 to a power supply and/or jumper wiring in next adjacent housing assemblies of a lighting array.

FIG. 7 shows schematically the interconnection of the electrical components of the housing assembly 10 to supply power to the illuminated tubing therein. As illustrated, power may be supplied from a suitable power source such as a low voltage DC power supply (not shown) by way of jumper wiring sections 53, 50 and wiring 48 to conventional transformer means 44 of a type suitable to convert the low voltage DC power source to the high voltage power sufficient to electrify and illuminate the inert gas or gases in the tubing 28. Power is supplied to the gas-filled tubing 28 by way of transformer output wiring 42 and electrodes 41 connected to the ends of the tubing.

Component sections 12, 16 and 24 of the housing assembly are easily assembled and interconnected by frictional engagement of the sections with each other. As best seen in FIGS. 4 and 6, lower side wall portions of cover section 24 of the housing assembly 10 project downwardly and have an upper shoulder 54 and lower protrusion 55 which receive and engage an elongated outer shoulder 56 on the upper wall edges of the central section 16 in snap-fit, frictional relation, such that the open sides of the channels of the cover section 24 and central section 16 are closed from weather contamination. The channels of the cover section communicate through the openings 40 (FIG. 5) in the ends of support plate 20 through which the tubing 28 passes.

In a similar manner, lower wall portions of central section 16 of the assembly project downwardly and have inward protrusions 58 which receive elongated shoulders 60 on the outer upper wall of mounting base section 12 in snap-fit, frictional engagement to close the open side of the mounting base channel 14. Located in opposed relation on the inner surface of the wall portions of the central section 16 of the housing assembly are passageways, the open ends 62 (FIG. 4) of which receive the threaded screws 38 to secure the end caps of the housing assembly to the ends of the housing sections and seal the ends of the cover section channel and the central channel of the assembly from the weather and contamination.

As best seen in FIG. 3, the inside surface of each of the end caps 36 of the housing assembly has peripheral and internal protruding ribs, as at 63 and 64, which engage the ends of sections 12, 16, and 24 to provide positional support and strength to the cover, central and base support sections of the assembly when the end caps are attached thereto. To further seal the channels of the cover and central sections of the assembly, the inner surface of the end cap may be provided with insulation material, such as foam rubber pad 66.

As best seen in FIGS. 8 and 9, which depict a modified form of end cap 70 for the housing assembly, the housing assembly may be attached to a suitable support surface by means of the end caps 70 alone. As seen, the lower sides 70a of the end caps extend further down to terminate in the same plane as the lower wall of the mounting base section 12 and are provided with protruding shoulder portions 70b having openings 72 therethrough to receive suitable fastening means, such as screws or nails, to attach the end caps directly to a support surface for support of the housing assembly.

From the foregoing description of preferred embodiments of the invention, it can be seen that the housing assembly may be easily supportably attached to and assembled on a supporting surface for use. Utilizing the assembly and end cap construction shown in FIGS. 1, 2, 3, 5, and 6, base support section 12 of the assembly first may be mounted on a receiving support surface by suitable fastening means, such as screws or nails, located in spaced openings 68 (FIG. 5) of the base section. Thereafter, the cover and central sections 24, 16 of the assembly with tubing and wiring may be attached in snap-fit frictional engagement with each other and to the previously mounted base support section 12, with the jumper wiring 50 and 52 supplying low voltage DC power to the transformer and tubing positioned in the channel of the base support section 12. If it is desired to attach the assembly to a support surface by using the modified form of end caps 70, as shown in FIGS. 8 and 9, the base, central, and cover sections and end caps 70 may be pre-assembled before mounting on a support surface, with all circuit and power supply wiring contained and hidden within the assembly housing. Thereafter, one or more housing assemblies is attached to a receiving surface by securing the end caps 70 thereto. End portions of the jumper wiring 50 are attached by either of jumper wiring sections 53 to a power supply line or to the next adjacent jumper wiring in an array of housing assemblies placed in end-to-end relation to establish illumination for a desired distance.

End caps of the housing assembly attached to the ends of the housing effectively seal the cover and central sections of the assembly, while the interconnecting short jumper wiring sections 53 between adjacent assemblies may be pushed into and located within the ends of the base plate channel 12, thus minimizing exposed lengths of wiring between interconnected housing assemblies of an array. By providing a high-voltage step-up transformer 44 in each housing assembly, power may be supplied to an array of assemblies from a single low voltage power source, e.g., 12 volt DC, thereby eliminating high-voltage wiring exposure between assemblies.

If it is desired to program individual housing assemblies of the lighting array in an off-on blinking patter, power and control circuit wiring from a remote control device may be run in parallel through one or more base plate channel sections of the contiguous assemblies to supply power alternately to individual one or more of the housing assemblies in the array, with power supply lines being contained within and protected by the housing assemblies, thereby substantially eliminating exposed wiring in the array.

The construction arrangement of the component parts of the housing assemblies and their manner of interconnection permit ready disassembly and repair of a housing assembly array in field locations with ready removal and replacement of tubes and transformers of the individual assemblies by workmen needing no specialized or skilled training.

As described above, we have determined that bright backlighting is unacceptable to the effective use of the accent lighting to be emitted from bulb 24 of housing assembly 10. To alleviate this problem, as shown in FIGS. 9–16, opaque sun shields 100 are used. In each embodiment of the sun shield, the sun shield is placed on the side of the housing assembly 10 closest to the sun.

In the embodiment of FIG. 10, housing assembly 10 is mounted to support surface S in the manner previously described. Screw 87 passes through holes in sun shield 100 and transparent section 24 to maintain sun shield 24 in the proper position.

In the embodiment of FIG. 11, sun shield 100 is L-shaped having a shield portion 101 and a mounting portion 102 having a screw hole therein. Sun shield 100 is mounted between support surface S and housing assembly 10.

In the embodiment of FIG. 12, sun shield 100 is snapped-on to transparent portion 24 of housing assembly 10. Transparent portion 24 is provided with protruding members 104' corresponding to catch members 104 of shield portion 101. Thus, the installer merely snaps catch members 104 over protruding members 104' to secure sun shield 100 to housing assembly 10.

In the embodiment of FIG. 13, sun shield 100 is internal to transparent portion 24 rather than external as in the other embodiments described herein. Accordingly, it is most likely that with this embodiment sun shield 100 would be pre-installed at the factory, rather than on-site, as with our other embodiments. In the embodiment of FIG. 13, sun shield 100 comprises a piece of opaque black-out tape (or film) 110 held between tabs 109 on the inside surface of transparent portion 24.

The embodiments of FIGS. 14 and 15 are similar to each other and to the embodiment of FIG. 12 in that sun shield 100 snaps into place. In FIG. 14, sun shield 100 has catch members 106 and 107 that snap under the lower wall portions of central section 16 and over protruding members 104" of transparent section 24. In FIG. 15, sun shield 100 has a protruding member 115 that not only snaps under the lower wall portions of central section 16, but is flattened so that it can be wedged between the support surface and the lower wall portions of central section 16. This provides for increased stability in the mounting of sun shield 100.

In the embodiment of FIG. 16, sun shield 100 is attached to, for example, transparent section 24 of housing assembly 10 via a piece of double-faced weatherproof adhesive tape 120 affixed to the inside surface of shield portion 101. Sun shield 100 is also provided with a positioning member 125 for the proper positioning of sun shield 100 with respect to housing assembly 10.

An additional note concerning sun shield 100 is as follows. Preferably, housing assembly 10 should be symmetrical about its longitudinal axis. Accordingly, as shown in each of FIGS. 10–16, there is no predetermined top and bottom of housing assembly 10 when it is mounted in a horizontal alignment and when the sun shield is not needed a full 180° of light transmission from housing assembly 10 is available (a feature unavailable with devices having permanent sun shields, such as paint on the inside of transparent section 24.) However, when sun shield 100 is needed, with this structure, regardless of how housing assembly 10 is attached to support surface S, it is possible to mount sun shield 100 so that it is positioned between the sun and housing assembly 10. This eliminates the possible need for having to remove housing assembly 10 from support surface S and having to "turn it over" should the user later decide that he wants to install sun shield 100. This also allows sun shields 100 to be sold as aftermarket products and a purchaser of housing assembly 10 need not purchase nor install sun shield 10 simultaneously therewith.

That which is claimed:

1. A lighting unit that reduces back lighting effects comprising:

a housing assembly containing an elongated bulb having a longitudinal axis, said longitudinal axis being horizontally aligned; the housing assembly further comprising a transparent portion within which said bulb is contained; and protruding members protruding out of at least said transparent portion; and a sun shield attached to a surface of said housing assembly, said sun shield positioned between a source of bright light independent of said housing assembly and said housing assembly.

2. The lighting unit according to claim 1, wherein said source of bright light is the sun.

3. The lighting unit according to claim 2, wherein said sun shield comprises a shield portion and a mounting portion.

4. The lighting unit according to claim 3, wherein said sun shield is attached to said housing assembly by said mounting portion.

5. The lighting unit according to claim 4, wherein:

said mounting portion comprises a fastener receiving hole;

said transparent portion having a fastener receiving hole; and a fastener is passed through both said fastener receiving holes to attach said sun shield to said housing assembly.

6. The lighting unit according to claim 4, wherein:

said mounting portion comprises a bracket portion perpendicular to said shield portion and having a fastener receiving hole therein;

said housing assembly is attached to a support surface by a fastener; and whereby said sun shield is attached to said housing assembly by said bracket portion being sandwiched between said support surface and said housing assembly with said fastener of said housing assembly passing through said fastener hole of said bracket portion.

7. The lighting unit according to claim 4, wherein:

said housing assembly has protruding members on an outside surface thereof;

said sun shield has at least one catch member on an inside surface thereof;

and whereby said sun shield is attached to said housing assembly by placing said at least one catch member of said sun shield over a corresponding protruding member of said housing assembly.

8. The lighting unit according to claim 7, wherein:

said housing assembly comprises a central portion onto which said bulb is mounted;

said protruding members of said housing assembly protrude out of at least said central portion.

9. The lighting unit according to claim 8, wherein said catch of said sun shield further comprises a flattened portion for wedging between at least one of said protruding members and said support surface.

10. The lighting unit according to claim 8, wherein:

said protruding members of said housing assembly protrude out of both said transparent portion and said central portion and said at least one catch member of said sun shield is placed over said protruding members of said transparent portion and said central portion.

11. The lighting unit according to claim 2, wherein:

said transparent portion has spaced apart tabs mounted on an inside surface thereof; and said sun shield comprises a piece of opaque film placed between said tabs and flush with said inside surface of said transparent portion.

12. The lighting unit according to claim 4, wherein:

said sun shield has one face of a piece of double-faced weatherproof tape attached to said mounting portion; and the other face of said piece of double-faced weatherproof tape is attached to said housing assembly.

13. The housing assembly according to claim 12, wherein said sun shield further comprises a positioning member for properly positioning said sun shield relative to said housing assembly.

* * * * *